United States Patent [19]

Renner

[11] 4,168,048
[45] Sep. 18, 1979

[54] EDDY CURRENT NUTATION DAMPER WITH PROGRESSIVE DAMPING FACTOR

[75] Inventor: Udo Renner, Leiden, Netherlands

[73] Assignee: Organisation Europeenne de Recherches Spatiales, Paris, France

[21] Appl. No.: 899,762

[22] Filed: Apr. 24, 1978

[30] Foreign Application Priority Data

Apr. 29, 1977 [BE] Belgium .................................. 177149

[51] Int. Cl.² .............................................. B64G 1/10
[52] U.S. Cl. .................................... 244/170; 188/1 B; 244/166; 310/105
[58] Field of Search ..................... 244/170, 166, 165; 188/1 B, 267; 74/5.5; 310/93, 105

[56] References Cited

U.S. PATENT DOCUMENTS

| 3,510,705 | 5/1970 | O'Neill et al. | 244/166 X |
| 3,806,062 | 4/1974 | Hofmann et al. | 244/170 |

Primary Examiner—Barry L. Kelmachter
Attorney, Agent, or Firm—Sughrue, Rothwell, Mion, Zinn and Macpeak

[57] ABSTRACT

A nutation damper apparatus capable of damping small nutation angles in a satellite. A permanent magnet mounted on the free end of a pendulum arm oscillates back and forth parallel to an adjacent conductive plate in the form of a circular segment having a cross-sectional area that increases from the center to its lateral ends, and induces in the plate a magnetic flux which is proportional to the deviation angle of the pendulum from its rest position.

1 Claim, 3 Drawing Figures

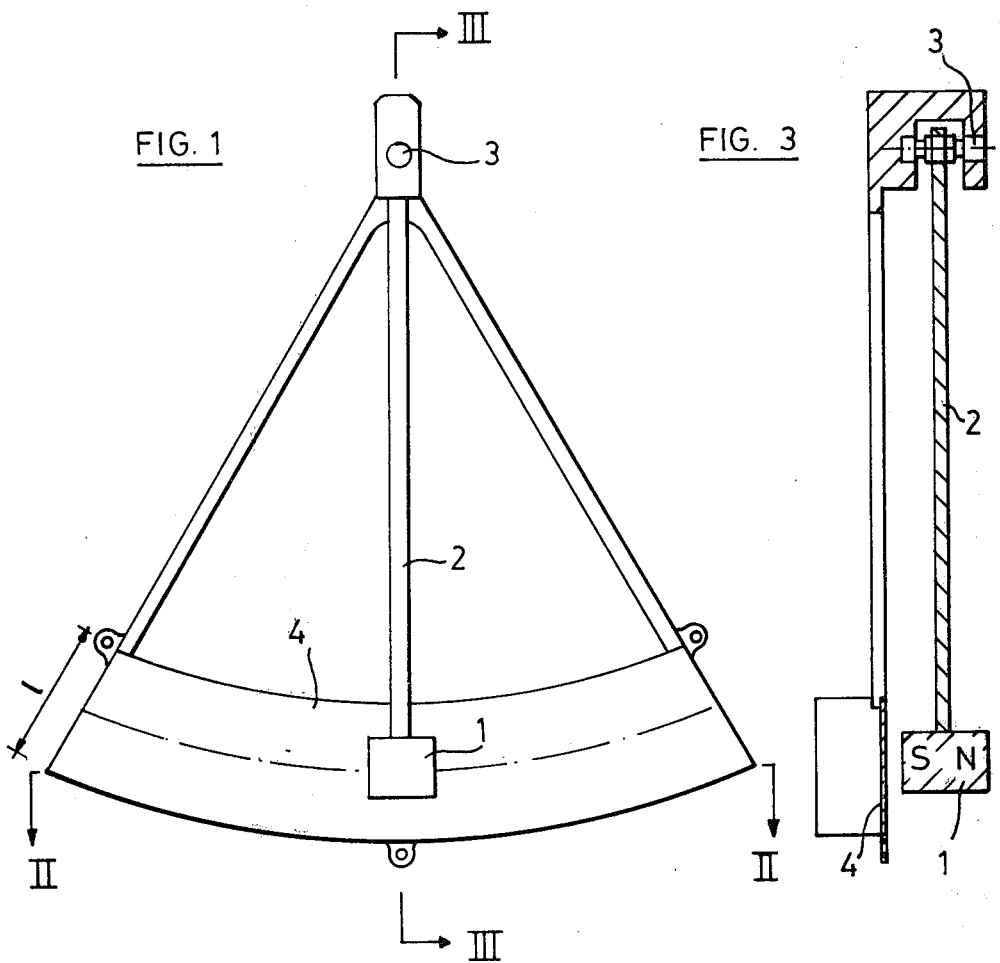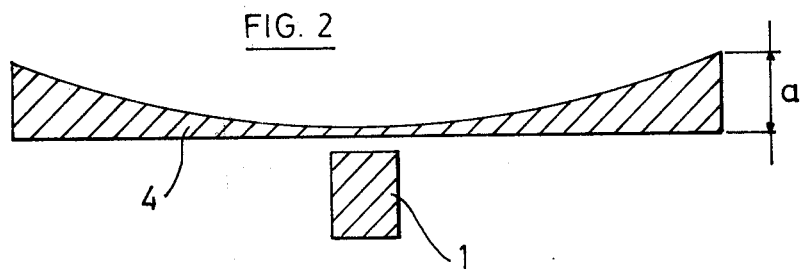

EDDY CURRENT NUTATION DAMPER WITH PROGRESSIVE DAMPING FACTOR

FIELD OF THE INVENTION

This invention relates to an apparatus for damping the nutation movement of a spinning spacecraft, said apparatus having a pendulum mass suspended for oscillating in a plane perpendicular to the spin axis of the spacecraft.

In the known apparatus for damping the nutation movement of a spinning spacecraft, the pendulum mass has a given spring constant and damping coefficient. In order to reduce the damping time constant it is necessary that the damping factor is kept as low as possible to allow the pendulum mass to oscillate at high amplitudes and to dissipate energy proportional to the square of the angular velocity of the pendulum. However, the maximum oscillation angle is always limited by design constraints and it is therefore necessary to adjust the damping factor for the maximum oscillation angle given by the design of the damper and for the expected nutation angle. The problem is that this expected maximum nutation angle is not well known in most cases and that the damping process always starts with large nutation angles and gradually reduces said angles. Therefore this type of damper apparatus is only optimised for medium size nutation angles: for large nutation angles this apparatus looses its performances due to saturation whereas for small nutation angles the damping effect is too high to permit reasonable oscillation amplitudes.

SUMMARY OF THE INVENTION

The object of this invention is to provide a damper apparatus having a progressive damping factor which is a function of the pendulum angular position.

Another object of the invention is to provide a damper apparatus capable of damping small nutation angles.

In accordance with the invention a permanent magnet fixed at the free end of a pendulum is capable of moving opposite to and parallel with plate means made of an electroconducting material and having the shape of a circular segment. The plate means is made such that its cross-sectional area increases along the circular axis there of from its portion opposite to the rest position of the pendulum to each of the lateral ends of the plate segment. With this arrangement, the permanent magnet always induces in the conducting plate means a magnetic flux which is proportional to the deviation angle of the pendulum from its rest position. In this apparatus the pendulum always oscillates at a reasonable velocity.

DESCRIPTION OF THE DRAWINGS

FIG. 1 is an elevational view of an embodiment of the apparatus according to the invention;

FIG. 2 is a sectional view along line II—II of FIG. 1;

FIG. 3 is a sectional view along line III—III of FIG. 1.

DESCRIPTION OF AN EMBODIMENT OF THE INVENTION

The apparatus comprises a pendulum 2 suspended to a pivot 3 in order to be capable of oscillating about the spin axis of a spacecraft. The pendulum has a permanent magnet 1 fixed at the free end thereof and opposite to this permanent magnet there is a plate means 4 made of an electroconducting material, e.g. copper or aluminum, which has the shape of a circular segment extending in a plane parallel with the plane of oscillation of the pendulum 2, this circular segment having its center point on the axis of pivot 3. This plate segment extends opposite to the travel path of the permanent magnet 1.

The thickness a of plate 4 increases from the middle portion thereof to each of its lateral ends. Thereby the cross-sectional area of plate 4 increases along its circular axis from its portion opposite to the rest position of the pendulum to each of the ends of the plate segment. With this arrangement the permanent magnet 1 is always opposite to a volume of conducting material which is proportional to the angular deviation of the pendulum from its rest position and during oscillation of the pendulum the magnet 1 moves opposite to a volume of conducting material which varies proportionally to the pendulum deviation angle from its rest position, whereby the magnetic flux which is induced in plate means 4 varies proportionally to said deviation angle. Consequently, the damping factor will be proportional to the deviation angle of the pendulum.

With a plate segment 4 having an opening angle of 60° approximately and a thickness which varies from 1 mm for instance near the rest position of the pendulum to about 10 mm at each end thereof, this damper apparatus is capable of damping a nutation angle as low as 0.3 degree.

It will be understood that the varying cross-sectional area of the plate means 4 can be realized with the plate width 1 varying from the rest position of the pendulum to the ends of the plate segment as well.

What is claimed is:

1. An apparatus for damping the nutation movement of a spinning spacecraft, comprising:
   (a) plate means of electroconducting material secured to the spacecraft, said plate means having the shape of a circular segment with its center point on the spin axis of the spacecraft;
   (b) pivot means located on the spin axis of the spacecraft;
   (c) pendulum means suspended at one end to said pivot means; and
   (d) permanent magnet means fixed at the other, free end of said pendulum means, adjacent a surface of said plate means, such that during oscillation movement of the pendulum means the permanent magnet means moves along a path parallel to said surface of the plate means;
   (e) said plate means having a uniform width measured along the radial direction of the circular segment, and the thickness of said plate means measured normal to said surface increasing from its portion opposite to the rest position of the pendulum means to each of the lateral ends of the plate segment such that during oscillation movement of the pendulum means, the permanent magnet induces in said plate means a magnetic flux proportional to the deviation angle of the pendulum means from said rest position.

* * * * *